United States Patent [19]
Schattschneider et al.

[11] Patent Number: 5,949,060
[45] Date of Patent: Sep. 7, 1999

[54] HIGH SECURITY CAPACITIVE CARD SYSTEM

[75] Inventors: George K. Schattschneider; Brian J. Doyle, both of Victoria, Canada

[73] Assignee: Coincard International, Inc., Victoria, Canada

[21] Appl. No.: 08/929,632

[22] Filed: Sep. 15, 1997

Related U.S. Application Data

[60] Provisional application No. 60/030,417, Nov. 1, 1996.

[51] Int. Cl.$^6$ .......................... G06K 11/00; G06K 19/06; G11B 9/06
[52] U.S. Cl. ...................... 235/492; 235/494; 235/451; 235/441; 235/439; 235/382
[58] Field of Search .................... 235/451, 494, 235/492, 441, 439, 382

[56] References Cited

U.S. PATENT DOCUMENTS

| | | | |
|---|---|---|---|
| 2,688,739 | 9/1954 | Hofgaard | 340/173 |
| 3,091,754 | 5/1963 | Nazare | 340/173 |
| 3,146,425 | 8/1964 | Benn et al. | 340/173 |
| 3,404,382 | 10/1968 | Rosenheck et al. | 340/173 |
| 3,582,908 | 6/1971 | Koo | 340/173 |
| 3,699,311 | 10/1972 | Dunbar | 235/61.11 H |
| 3,719,804 | 3/1973 | Illing | 235/61.11 H |
| 3,868,057 | 2/1975 | Chavez | 235/61.7 B |
| 3,869,082 | 3/1975 | Ludin | 235/61.11 H |
| 3,876,865 | 4/1975 | Bliss | 235/61.12 C |
| 4,017,834 | 4/1977 | Cuttill et al. | 340/149 A |
| 4,280,119 | 7/1981 | May | 340/147 MD |
| 4,553,026 | 11/1985 | Arlowe | 235/451 |
| 4,587,410 | 5/1986 | Milnes | 235/382 |
| 5,159,181 | 10/1992 | Bartels et al. | 235/441 |
| 5,218,189 | 6/1993 | Hutchison | 235/439 |
| 5,321,322 | 6/1994 | Verheyen et al. | 307/465.1 |
| 5,371,346 | 12/1994 | Menoud | 235/381 |
| 5,471,039 | 11/1995 | Irwin, Jr. et al. | 235/441 |
| 5,471,040 | 11/1995 | May | 235/451 |
| 5,521,831 | 5/1996 | May | 364/483 |

FOREIGN PATENT DOCUMENTS

| | | | |
|---|---|---|---|
| 0 422 482 A2 | 10/1990 | European Pat. Off. | G06K 1/12 |
| 28 12 388 | 3/1978 | Germany | G11B 9/06 |
| 299 784 | 5/1992 | Germany | G06K 19/06 |
| 57-111885 | 7/1982 | Japan . | |
| 1260982 | 9/1986 | Russian Federation | G06K 11/00 |
| WO 84/00075 | 1/1984 | WIPO | G11C 17/04 |
| WO 91/15008 | 10/1991 | WIPO | G09C 5/00 |
| WO 95/14285 | 5/1995 | WIPO | G06K 7/08 |

OTHER PUBLICATIONS

PCT International Search Report, International Application No. PCT/CA97/00808, mailed Mar. 4, 1998, 4 pages in length.

*Primary Examiner*—Thien Minh Le
*Assistant Examiner*—Daniel S. Felten
*Attorney, Agent, or Firm*—Limbach & Limbach L.L.P.

[57] ABSTRACT

A high security data storage and retrieval system is disclosed which includes a novel low-cost laser-etched data card which can be read from and written to using a capacitively-coupled interface. The card includes a plurality of first and second electrodes arranged in a checkerboard pattern on a non-conductive substrate. A plurality of conductive links are interconnected between adjacent first and second electrodes of the card. The checkerboard pattern of electrodes on the cards permits each first electrode to be connected to as many as three or more second electrodes. An interface module is provided which can selectively address each first electrode and any adjacent second electrode. By this arrangement, the subject system is capable of storing a greater amount of information on a card. This increase in stored information is useable to provide a high level of protection against counterfeit card production.

61 Claims, 17 Drawing Sheets

HIGH SECURITY CAPACITIVE CARD SYSTEM

This application claims priority from Provisional Application No. 60/030,417, filed Nov. 1, 1996, by inventors George K. Schattschneider and Brian J. Doyle.

TECHNICAL FIELD

The subject invention relates to a high security data storage and retrieval system that includes a low-cost laser-etched data card which can be read from and written to using a capacitively-coupled interface.

BACKGROUND OF THE INVENTION

A variety of different stored-value cards have been used as a substitute for cash payments. Magnetic stripe, microchip card, and capacitive cards have been used and each have their own unique properties and benefits. Capacitive cards and their corresponding read/write systems have been extensively described in previously published documents. For example, U.S. Pat. No. 3,699,311 issued Oct. 17, 1972 to Dunbar, describes a system that uses capacitive coupling to read binary data encoded as links embedded on a separate card. PCT application WO 84/00075 to Folkmann enhances the usefulness of the Dunbar concept by capacitively coupling high energy into a card to blow the embedded links thereby creating a write-once-read-many (WORM) card system. German patent 2,812,388 (Machate) describes a WORM capacitive card system that uses a capacitively-coupled write signal that achieves a high energy level by using a differential drive and a higher frequency than the read signal. There are many additional patents that are variations on the theme of capacitively-coupled data card systems, but these three are mentioned since they clearly identify some of the common and fundamental aspects of the technology.

All of the relevant patents describe a data card storage and retrieval system which includes an interface module and a data card each including a matching pattern of primary and secondary electrodes. The data card further includes a plurality of conductive links, each link extending between an isolated primary and a common secondary electrode. The "links" are referred to by various terms including connecting strips, data elements, bridges and fuses but their context clearly indicates that they refer to the same component in all cases. When a link is intact it is in a low-impedance state and when a link is broken it is in a high-impedance state. The state of each link is used to represent a binary bit of data.

In operation, the card is juxtaposed with respect to the interface module so that the matching electrodes are capacitively coupled. In order to read the data on the card, a signal having a predetermined voltage and frequency is directly applied to a selected primary electrode and the corresponding common electrode on the interface module. The signal is then capacitively coupled to the matching card electrodes. The signal then passes through the link which is directly connected between the card electrodes. The impedance of the link is determined and the result is used to derive the state of the link.

In those patents which also describe how information is written onto a card, the voltage level and/or the oscillating frequency of the impressed signal is increased causing a large current to flow in the link thereby blowing it. The hardware for a capacitive card system is generally low in cost, requires fairly low power to operate and provides a non-rechargeable or write-once-read-many (WORM) disposable memory card.

Being non-rechargeable, capacitive cards have a tremendous advantage over both earlier magnetic and microchip cards as they eliminate a high percentage of the least sophisticated but most common kind of fraud which is perpetuated by simply recharging otherwise legitimate cards. However, all earlier capacitive card systems have one major drawback in that it is difficult to protect against the production of counterfeit cards. This is primarily due to the relatively low memory density of the cards which is in turn due to the physical limitations on the number of electrodes that can be formed on a surface of a card.

The number of electrodes on the card is limited by the power available from the interface module. In many systems, particularly those relying on batteries for power, the available power is low. As the number of electrodes on the card are increased, their size must be reduced. As the electrodes are reduced in size, the amount of current that can be capacitively coupled to the electrodes is reduced. At some point, the electrodes will become so small that not enough current can be made to flow through the electrodes via the capacitive coupling to reliably fuse the links. Therefore, a data card of a given size can only accommodate a limited number of electrodes in a commercially viable system.

In all of the capacitive card systems referred to above, the design and arrangement of the primary electrodes, common electrodes, and fusible links limited the total number of data bits per card to the number of primary electrodes. Additional bits of data could be stored by using multiple links between each primary electrode and the common electrode. However, this approach does require a more sophisticated control scheme and much more sensitive and accurate read and write electronics. Any scheme with more than two or three fusible links between each primary and common electrode would be almost impossible to achieve in a commercially viable capacitive card system. In all of these prior art systems, there was no suggestion of an approach for providing additional data links by connecting a primary electrode to more than one other electrode in the pattern.

These restrictions severely limit the number of data bits which can be stored on a card. With only a limited amount of data storage, a card is relatively easy to counterfeit since it is not possible to utilize any security-enhancing encryption techniques. This weakness results in capacitive stored-value card systems having reduced market potential, as security of transaction has become the major consideration of most card issuers.

Using a uniquely different interface module and a new method of laser encoding the cards, both of which are described below, a significant improvement in counterfeit protection for capacitive card systems has been developed.

Accordingly, it is an object of the subject invention to provide a more secure capacitive data card system.

It is a further object of the subject invention to provide a new and improved method for manufacturing secure capacitive data cards.

SUMMARY OF THE INVENTION

In accordance with the above recited objects, the subject invention includes an interface module which functions to read from and write to the card in a highly secure fashion. The interface module includes a contact face having a plurality of first and second electrodes arranged in a pattern that alternates and repeats in both the horizontal and vertical direction. When an orthogonal matrix of rectangular electrodes is used, the arrangement could be described as a "checkerboard pattern". For ease of description, the term "checkerboard pattern" will be used in the text and claims to cover both a traditional orthogonal matrix of rectangular electrodes as well as other geometric patterns that alternate and repeat in two axes.

A switching network, under the control of a microcontroller, is provided to individually address selected pairs of the first and second electrodes. A signal generation circuit is provided to supply the read and write signals sent to the electrodes through the switching network. A detection circuit is provided to condition the read signal returned from the electrodes in preparation for analysis. A pre-programmed microcontroller is provided to analyze the conditioned read signals as well as to control all aspects of the interface module.

The system further includes a data card having a similar alternating "checkerboard pattern" of first and second conductive electrodes formed on a non-conductive substrate. The electrode pattern on the card matches the electrode pattern on the contact face of the interface module. A plurality of conductive links are interconnected between selected adjacent first and second electrodes on the card. The state of a link, whether broken or unbroken, represents a data bit.

In operation, the card is juxtaposed with respect to the contact face of the interface module so that the matching electrodes are pressed tightly against each other. In order to read data from the card, a low-power signal is applied to a selected pair of interface module electrodes which capacitively couple the signal to the matching pair of card electrodes. By analyzing the effect on the signal caused by passing the signal through the link, the impedance of the link connecting the card's electrode pair is determined. The result is used to derive the state of the link. When information is to be written to the card, the signal level and/or frequency delivered to the card is increased which causes a large current to flow in the link thereby blowing it.

Unlike the cards found in the prior art, the checkerboard pattern of electrodes on the subject cards permits each first electrode to be connected to two or more second electrodes. In one embodiment, which utilizes rectangular electrodes arranged on an orthogonal grid, each corner first electrode can be connected to two adjacent second electrodes while each of the remaining first electrodes on the periphery of the pattern can be connected to three adjacent second electrodes. The first electrodes located within the periphery of the pattern can be connected to four adjacent second electrodes. In the preferred embodiment, electrodes within the periphery are often connected to two adjacent electrodes and are not connected to the two remaining adjacent electrodes.

Since the number of possible interconnection patterns through each electrode is significantly increased, a far greater number of possible encoding patterns can be used. The availability of extra information storage for a given electrode area permits sophisticated encryption schemes to be used to encode and authenticate the cards. By this approach, the ability to produce valid counterfeit cards is substantially reduced.

A number of different electrode shapes and geometric patterns can used to implement the concepts of the subject invention. At a minimum, each electrode should have at least three sides. The concept can be most easily implemented using rectangular electrodes laid out in an orthogonal checkerboard pattern. Additional data storage capacity may be obtainable by using higher order polygons such as hexagons or octagons or even combinations of various polygons. Examples of these patterns will be described. However, it should be understood that all of these embodiments share the general characteristic that each electrode can be connected to more than one other electrode in the pattern permitting an extremely large number of different link patterns rather than the single one that was available in the prior art. Furthermore, all of these different link patterns can be accommodated with the same hardware interface.

BRIEF DESCRIPTION OF THE DRAWINGS

FIG. 12b illustrates the equivalent circuit of the link shown in FIG. 12a.

FIG. 13b illustrates the equivalent circuit of the links shown in FIG. 13a.

DETAILED DESCRIPTION OF THE PREFERRED EMBODIMENTS

Figure 1:
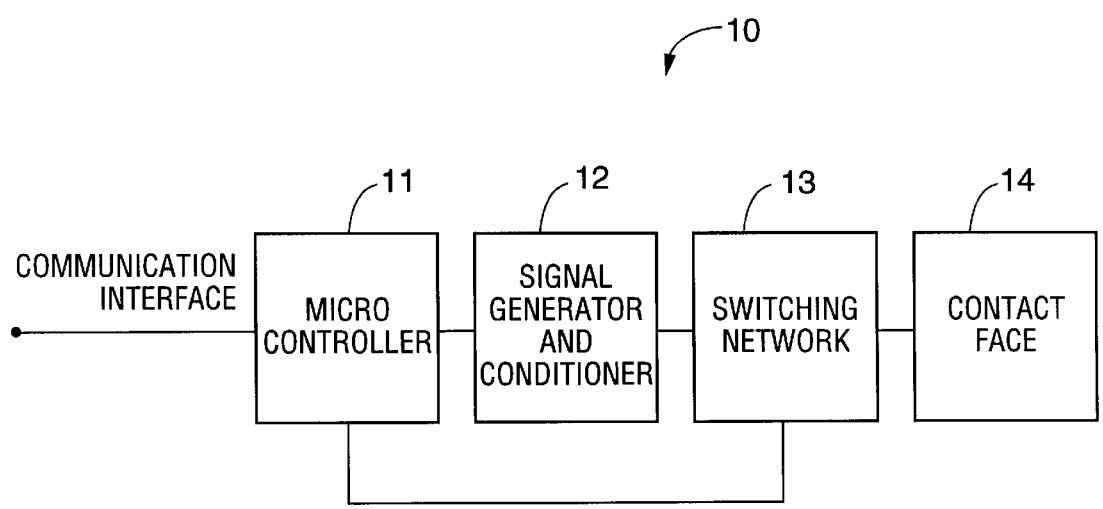
FIG. 1 is a simplified schematic diagram of the interface module of the subject invention.

Referring to FIG. 1, the subject invention includes an interface module 10 which functions to read and write to a card in a highly secure fashion. The interface module includes a microcontroller 11 which communicates with an external master microprocessor through communication interface. The communication interface also provides conduits for all of the power supply requirements of the circuitry on the interface module. The microcontroller 11 controls the functioning of the signal generator and conditioner 12 and the switching network 13. The signal generator and conditioner 12 generates the read and write signals, provides appropriate interfacing to the switching network 12, provides signal conditioning for the received read signal enroute to the microcontroller 11, and detects the presence of a card. The switching network 13 provides the circuitry that routes the read and write signals to the appropriate electrodes on the contact face 14. The electrodes on contact face 14 are used to transfer the read and write signals to an appropriately designed card using capacitive coupling.

Figure 2:
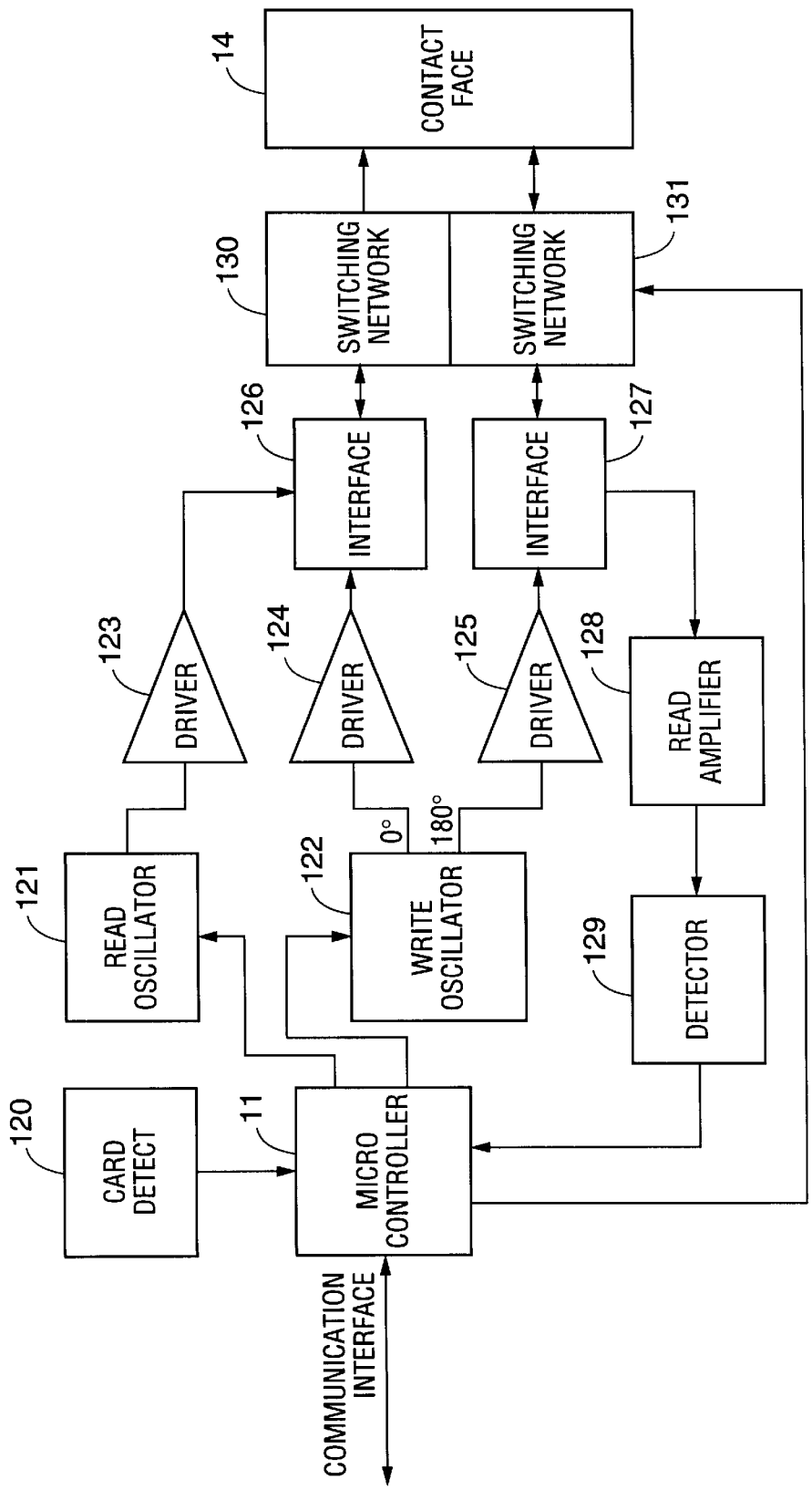
FIG. 2 is a more detailed schematic diagram of the interface module of the subject invention.

In the read mode, the interface module is capable of generating a low power signal which can drive an adjacent pair of electrodes and non-destructively determine the impedance of a link located on an appropriately designed card. The impedance values can be determined with sufficient accuracy to reliably identify two or more different styles of link on a single card. As shown in FIG. 2, the read signal is initiated at oscillator 121, and travels through driver 123, interface 126, switching network 130, and contact face 14. The read signal is then capacitively coupled out to a data card, passes through the selected link, and returns back through contact face 14, switching network 131, interface 127, read amplifier 128, and detector 129. Finally, the detected read signal is routed to microcontroller 11.

In the write mode, the interface module is capable of driving an adjacent pair of card electrodes with sufficient power to destroy a link located on an appropriately designed card. The 0/180 degree write signals are initiated at oscillator 122, and pass through drivers 124/125, interfaces 126/127, switching networks 130/131, and contact face 14. This differential write signal is then capacitively coupled out to a data card.

As shown in FIG. 2, microcontroller 11 is directly connected to oscillators 121 and 122 and gates on either one as required. Oscillator 121 is configured to generate a low frequency signal intended for reading card data. Driver 123 is used to buffer the read oscillator and output a low level signal.

Oscillator 122 is configured to generate high frequency signals, intended for writing card data, at 0 and 180 degrees of phase shift. The write frequency is chosen to maximize the signal transfer across the capacitively-coupled matching electrodes in the contact face/card interface while minimizing the signal loss in the switching networks and the stray paths. The use of 0 and 180 degree signals enables the application of a differential drive to the card. This allows for twice as much voltage and four times as much power to be applied to a link on a card than if single-ended drive were used. Differential drive is a common technique used by electronic designers to produce the maximum signal level across a load for a given power supply voltage.

The write signals are buffered by a pair of power drivers 124 and 125. The drivers amplify the write signals to produce a rail-to-rail output voltage and then buffer them to increase the current drive capacity. The driver output signals are in the form of a square wave to maximize efficiency and minimize circuit complexity.

Interface circuit 126 provides matching between both the read and 0 degree write circuits and the switching network 130. The interface circuit provides a means to modify the highly capacitive load of the switching network and presents a resistive load to both the read and write drivers. In addition, interface 126 also provides a means to allow either one of the driver circuits 123 or 124 to pass it's signal through to the switching network without interfering with the other circuit.

Interface circuit 127 provides matching between the 180 degree write circuit and the switching network 131. The interface circuit provides a means to modify the highly capacitive load of the switching network and presents a resistive load to the write driver as well as to the received read signal. In addition, interface 127 also provides a means of directing the received read signal to the read amplifier 128 and detector 129.

Read amplifier 128 provides signal conditioning to the read signal by buffering, filtering, and amplifying it. The buffer ensures that interface 127 is appropriately loaded. A bandpass filter in the read amplifier 128 reduces the levels of any out-of-band signals and thereby improves the signal-to-noise ratio. The amplifier increases the amplitude of the signal to ensure that the full range of the microcontroller's a/d conversion circuitry is used.

Detector 129 produces a dc voltage that is proportional to the ac voltage of the conditioned read signal. This dc voltage is sampled and digitized by an analog-to-digital converter which is built into the microcontroller 11. The value of the digitized signal allows the microcontroller to evaluate the impedance state of the link being read.

Interfaces 126 and 127 are connected to switching networks 130 and 131 respectively. The switching networks connect the impedance-matched signal lines to electrode pairs on the contact plate based on the microcontroller-selected values present on the address lines. They are connected in a unique way that allows the microcontroller to access links on the card that exist in the interface between any orthogonally adjacent pair of card electrodes. The networks are constructed using a multiplicity of 74HC4051s. The "4051" is a cmos integrated circuit that functions as an eight channel analog multiplexer/demultiplexer. A number of other multiplexers could also have been used. Eight 4051s are used for each switching network allowing each network to connect to 64 electrodes. This number could be decreased or increased as required.

A card detect circuit 120 is included in the interface module to inform the microcontroller that a card has been detected. If, during insertion, a card is held against the contact face with a pre-tensioned pressure plate, a capacitively-coupled card detect circuit can be used. If a card is inserted loosely, capacitive coupling will not work reliably. In this case, an optical card detect circuit can be used.

Figure 3:
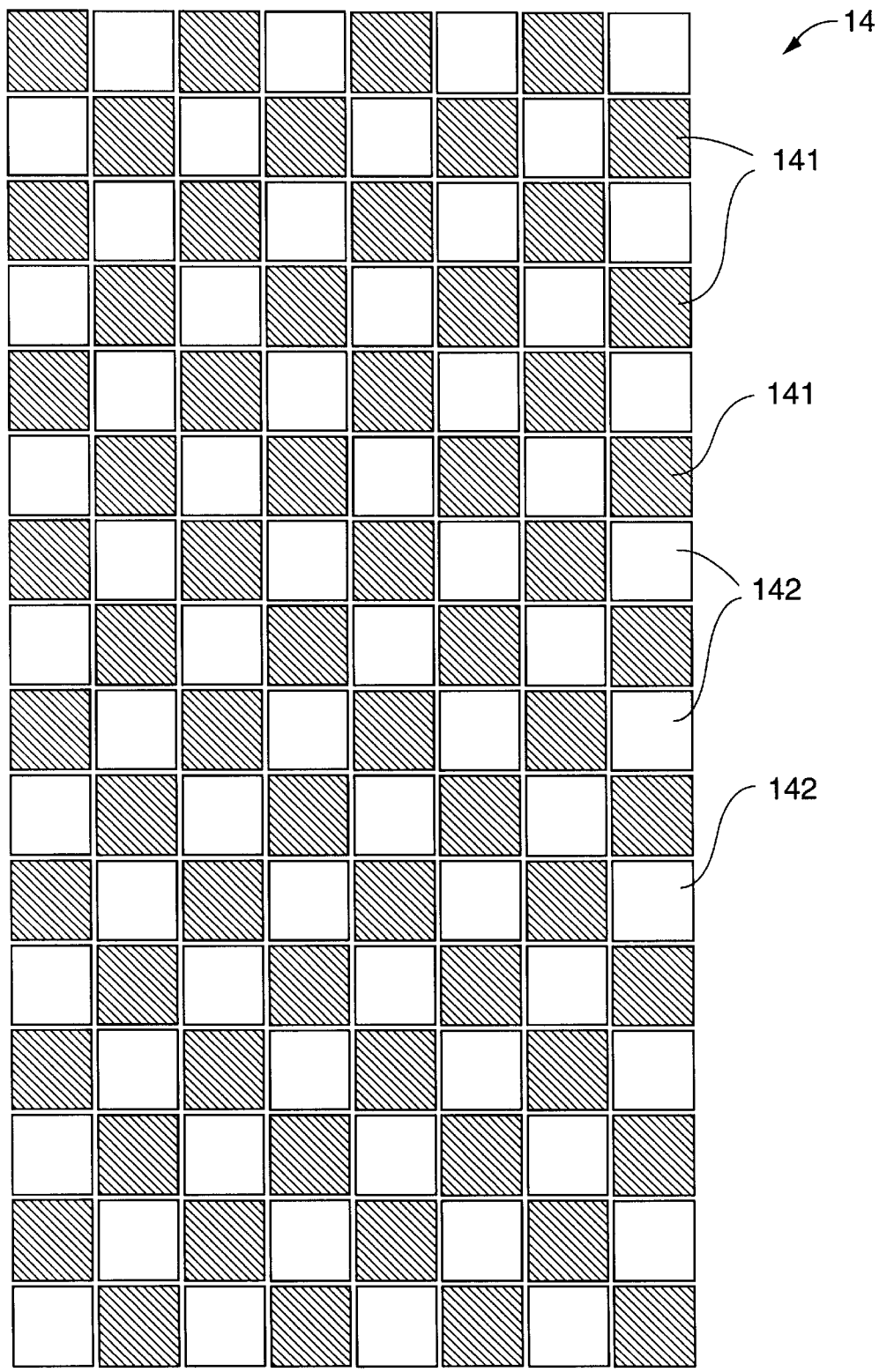
FIG. 3 is a schematic diagram of the contact face of an interface module using an orthogonal array of rectangular electrodes.

The switching networks 130 and 131 connect to contact face 14. As shown in FIG. 3, the contact face 14 of the interface module contains an array of electrodes 141 and 142. In the diagram, a 16×8 array of electrodes is shown shaded in a checkerboard pattern. The actual electrodes on the contact face will all be of the same color. The shading scheme in this diagram is used to illustrate the means of connection to the interface module circuitry. All of the dark colored electrodes 141 are connected to switches in the 0 degrees switching network 130 and all of the light colored electrodes 142 are connected to switches in the 180 degrees switching network 131. This method of connection ensures that it is always possible to write to and read from a link that is located between orthogonally adjacent card electrodes.

Figure 4A:
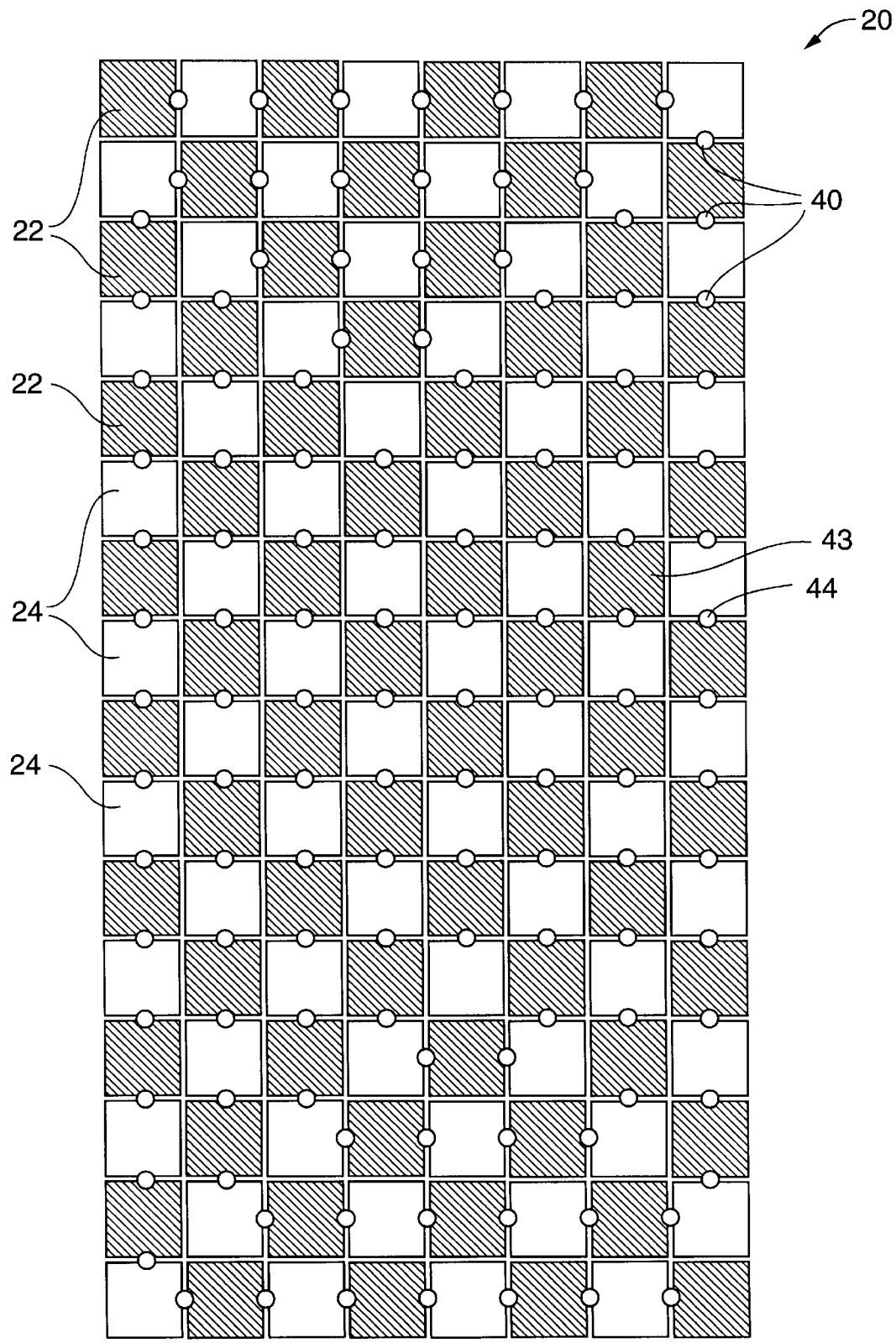
FIG. 4a is a schematic diagram of a data card for use with the contact face shown in FIG. 3 and illustrating one possible scheme for deploying the conductive links between orthogonally adjacent electrodes.

Each electrode on the contact face acts as one of the two plates in a capacitor. The other plate is located on the data card 20 as shown in FIG. 4a. The electrode structure on the card matches the electrode structure on the interface module. As shown in FIG. 4a, the card 20 includes an array of first and second electrodes 22 and 24 arranged in the same checkerboard pattern as the interface module. A similar shading scheme has been used to illustrate the correspondence.

Unlike the electrode structure of the interface module, the electrode structure on the card further includes a plurality of links 40 with each link existing at a possible link location. A "link" is defined as a conductive path or connection which has been created in the metal film of the card. A "possible link location" (PLL) (see numeral 43 for example) is defined as the area between a given electrode and any one of its orthogonally adjacent neighbor electrodes. In FIG. 4a, if a link exists at a PLL, this is shown schematically with a small circle (see numeral 44 for example).

In a rectangular matrix of rectangular electrodes, the four outside corner electrodes will have two PLLs, the remaining outside electrodes on the periphery will have three PLLs, and all of the interior electrodes will have four PLLs. If a link is created at a PLL, it acts as an electrically conductive path between the two electrodes that it joins. Each electrode may have as few as zero and as many as four such links connected to it.

Figure 4B:
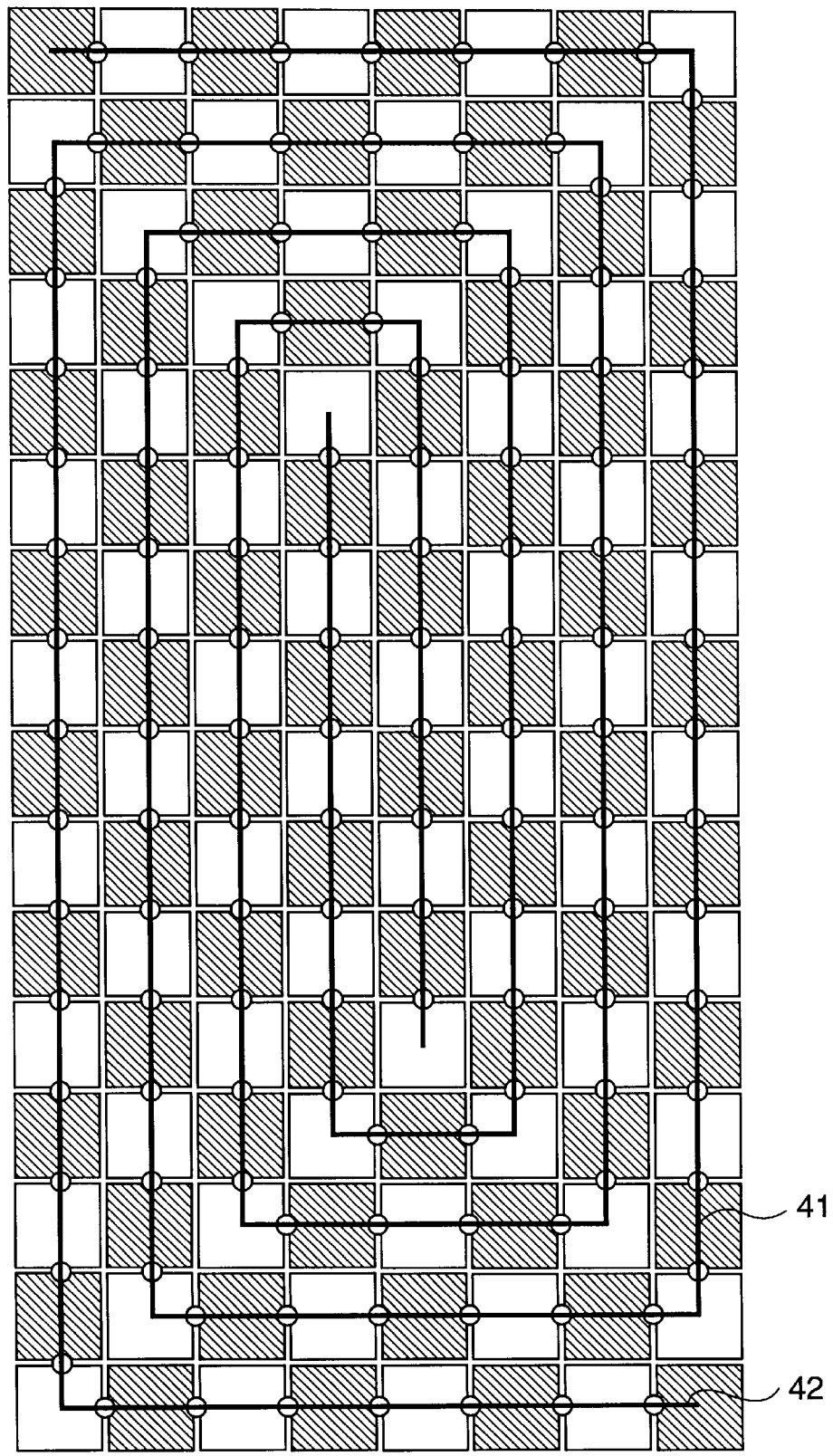
FIG. 4b is a schematic illustration of the data card shown in FIG. 4a with the links connected by imaginary lines to better illustrate the link pattern.

Most card electrodes share link connections with any two of their four orthogonally adjacent neighbors. Consider the imaginary lines 41 and 42 shown in FIG. 4b that connect all of the links on the card. The lines trace patterns that snake through the entire electrode matrix and pass through or terminate at each electrode exactly once. The imaginary lines, after entering an electrode through one of the four PLLs, leave the electrode through any other one of the three remaining PLLs. It is clear that the capability to etch links at will at any two of the four PLLs at each electrode can produce a multitude of unique and differentiable card layouts.

Figure 5A:
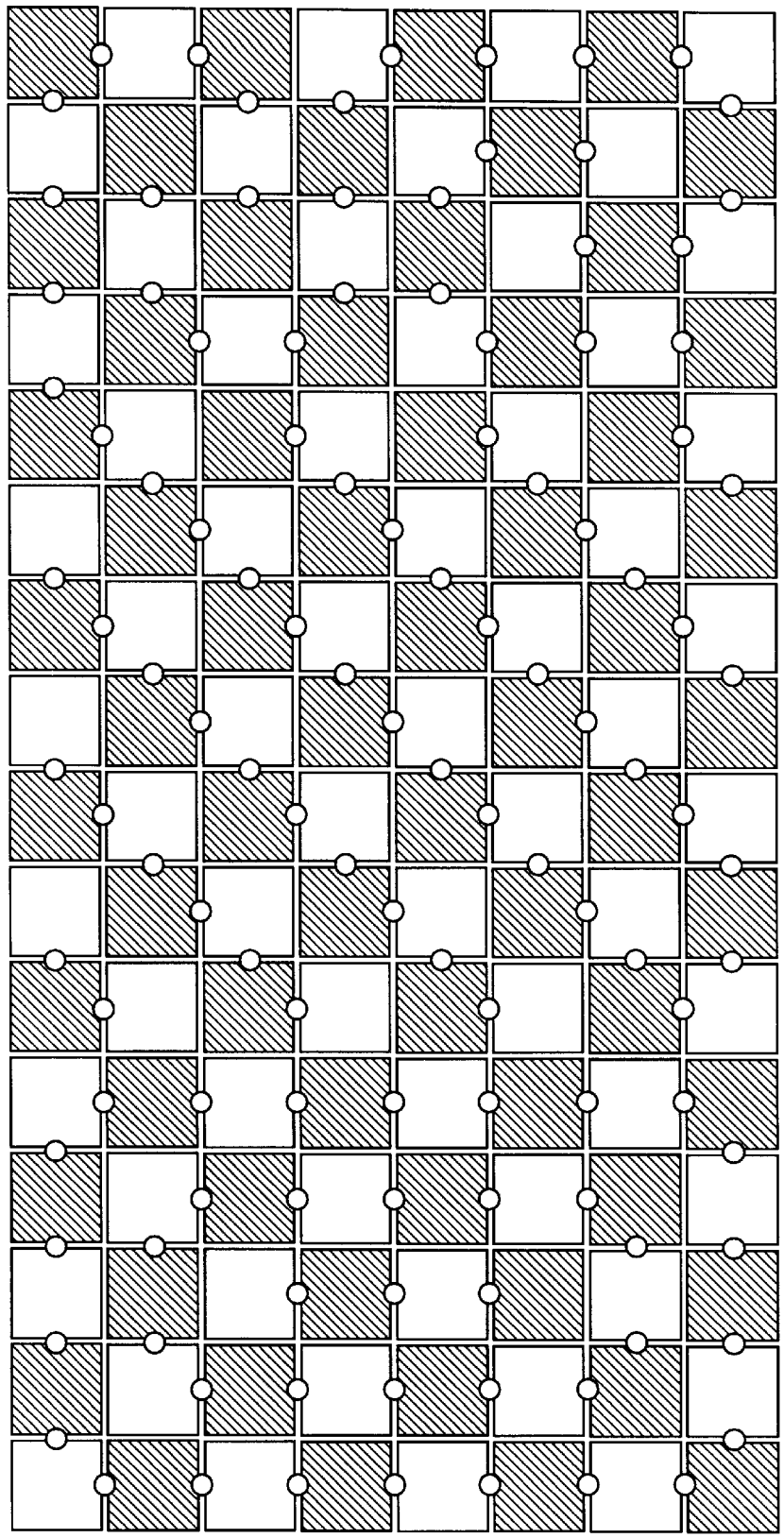
FIG. 5a is a schematic diagram of a data card for use with the contact face shown in FIG. 3 and illustrating a second possible scheme for deploying the conductive links between orthogonally adjacent electrodes.
Figure 5B:
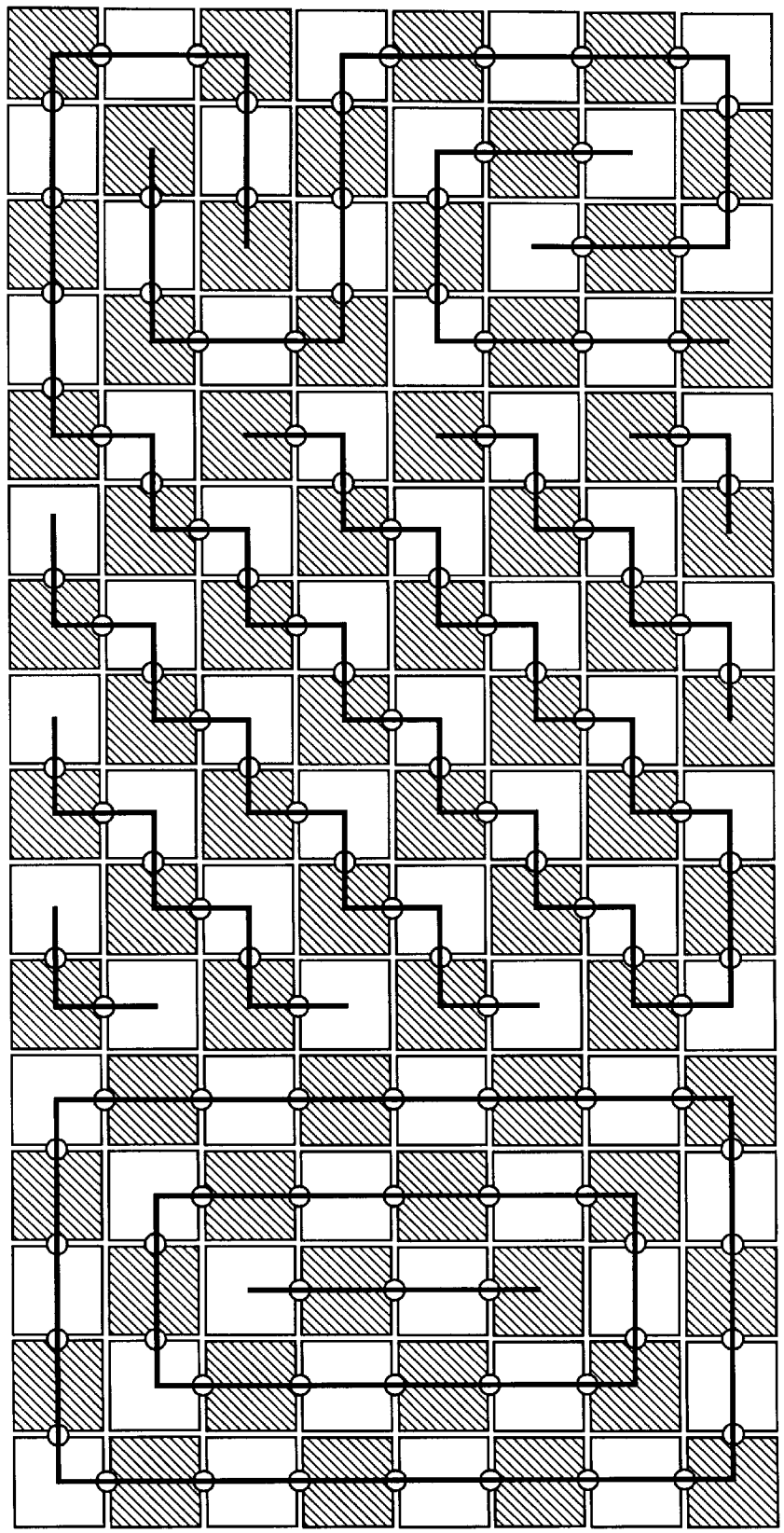
FIG. 5b is a schematic illustration of the data card shown in FIG. 5a with the links connected by an imaginary lines to better illustrate the second link pattern.
Figure 6A:
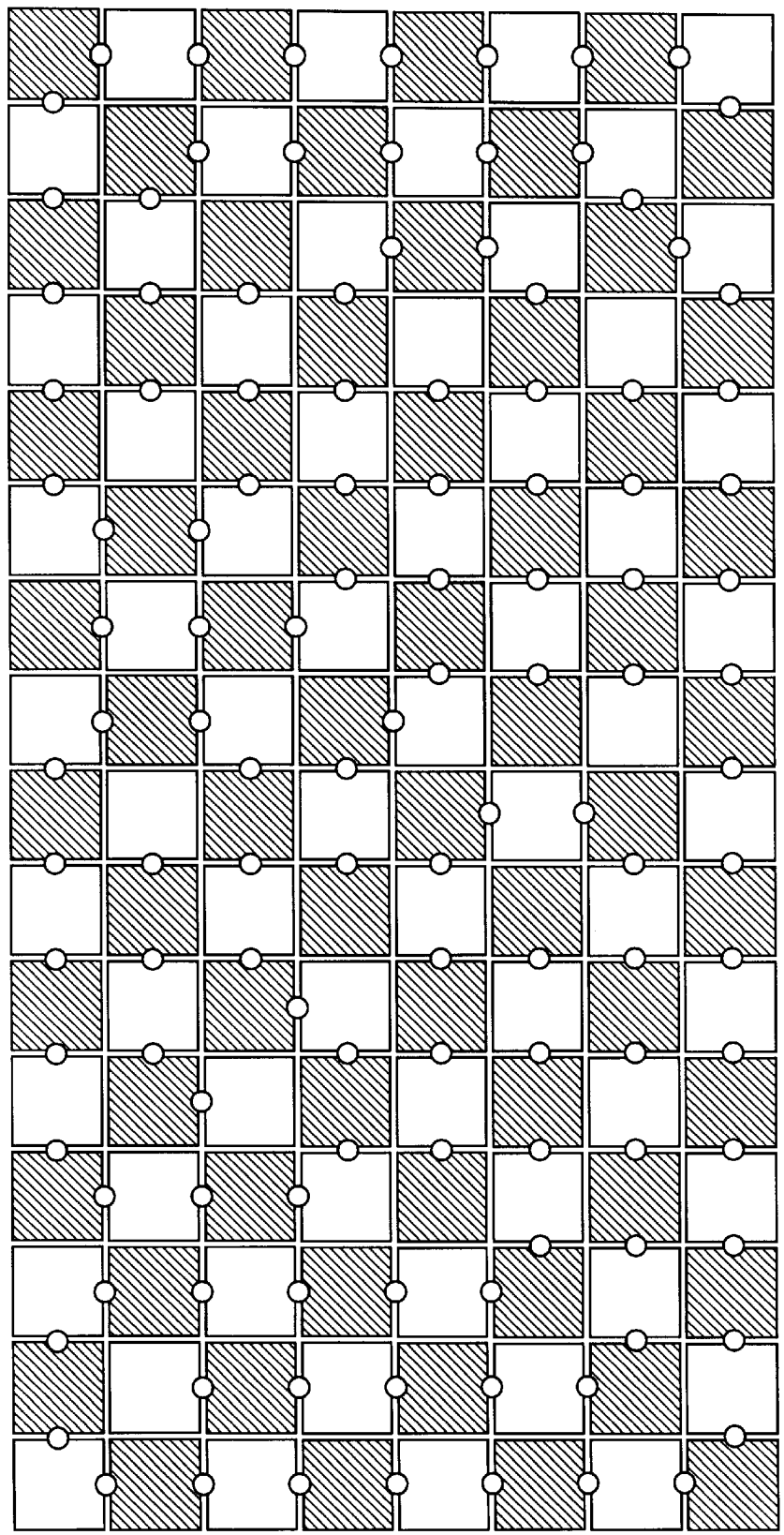
FIG. 6a is a schematic diagram of a data card for use with the contact face shown in FIG. 3 and illustrating a third possible scheme for deploying the conductive links between orthogonally adjacent electrodes.
Figure 6B:
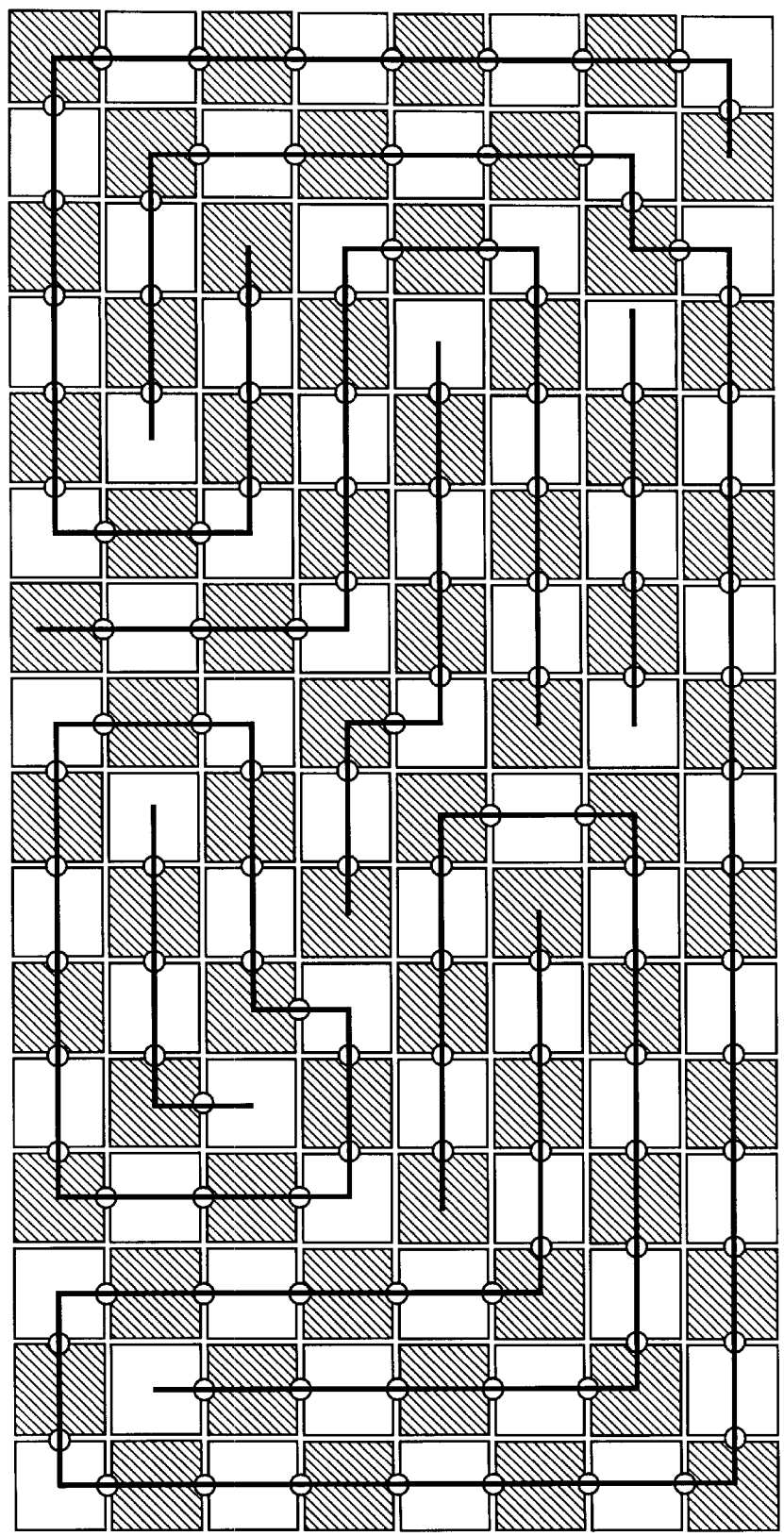
FIG. 6b is a schematic illustration of the data card shown in FIG. 6a with the links connected by an imaginary lines to better illustrate the third link pattern.

FIGS. 5 and 6 graphically demonstrate additional ways of positioning the links on a 16×8 matrix of electrodes. What is also demonstrated is the fact that there are an exceedingly large number of ways of arranging links between orthogonally adjacent electrodes in a relatively small matrix of electrodes. Furthermore, the number of ways of arranging the links increases exponentially with respect to a linear increase in the number of electrodes in the matrix. It is therefore possible to produce an extremely large number of physically different cards using a relatively limited number of electrodes.

With a 16×8 array of electrodes, which is the size of the preferred embodiment, the number of variations is so large that it is possible to make each card unique, identifiable, and traceable. Equally important is the fact that the identical hardware interface can be used to read and write to all of these physically different cards. The software, which is embedded in the interface module's microcontroller, is designed to recognize legal variations in link arrangement and reject counterfeit arrangements.

Figure 7:
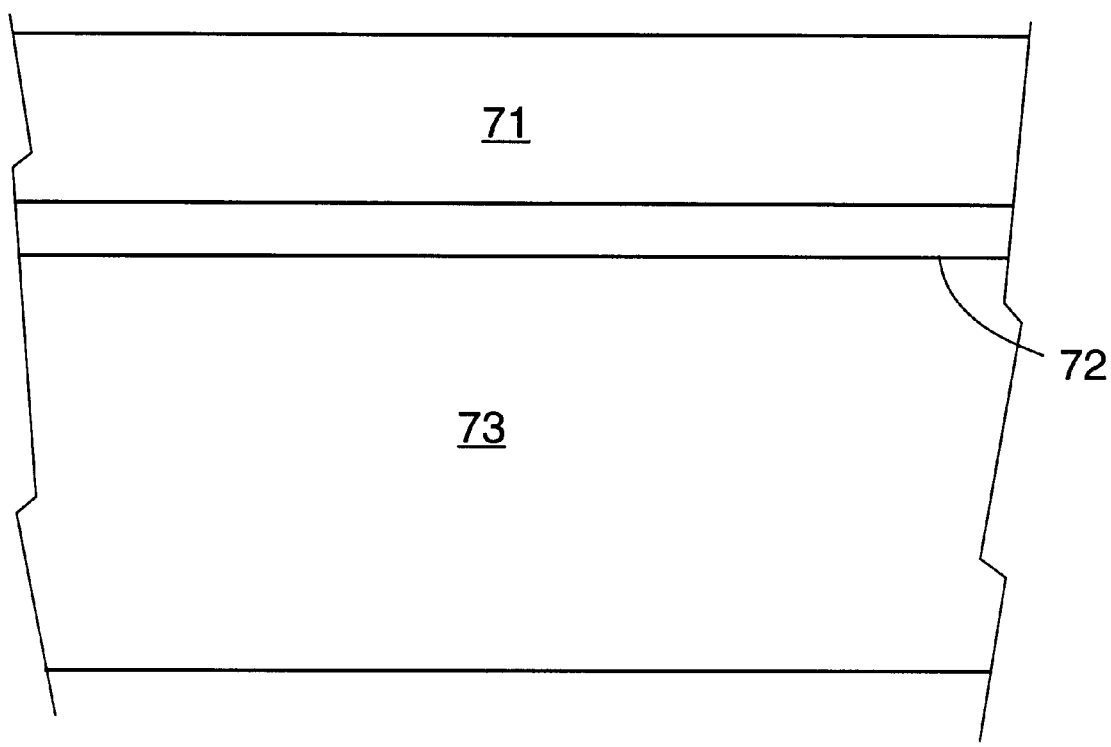
FIG. 7 is a cross section view of a data card formed in accordance with the subject invention.

A cross section of the data card 20 is illustrated in FIG. 7. The card consist of a very thin metal film 72 sandwiched between a thin, optically transparent protective layer 71 and a thicker carrier substrate 73. The metal film 72 is electrically conductive and is only a few hundred angstroms thick.

A high-precision computer-controlled laser-etching system can be used to create both the electrode and link patterns on the card. By pulsing a laser beam at the metal film, a spot on the metal film equal to the cross-sectional area of the laser beam can be "etched" away in an electrical sense. In practice, it is not necessary that the metal film be actually removed by the laser, but merely that its electrical characteristics be altered. It is believed that the laser can be used to locally oxidize the film, thereby rendering it nonconductive. The term "etch" in this context and in the claims is intended to cover either the actual removal of the metal or merely an alteration of its electrical properties.

If a laser beam is scanned across an entire section of the film, the single section is separated into two sections which are now electrically isolated from each other. A scanning laser beam of the appropriate wavelength, pulse width, and repetition rate is used to etch electrodes onto the card in the shape and pattern matching the corresponding electrodes found on the interface module. During the same processing step, the laser beam is used to etch the appropriate links at the selected PLLs. Alternately, cards may be bulk manufactured using masking, photographic, or other methods to produce the electrode pattern with links included at every PLL. A laser beam can then be used solely to remove the unwanted links by etching through them to make them nonconductive.

Figure 8A:
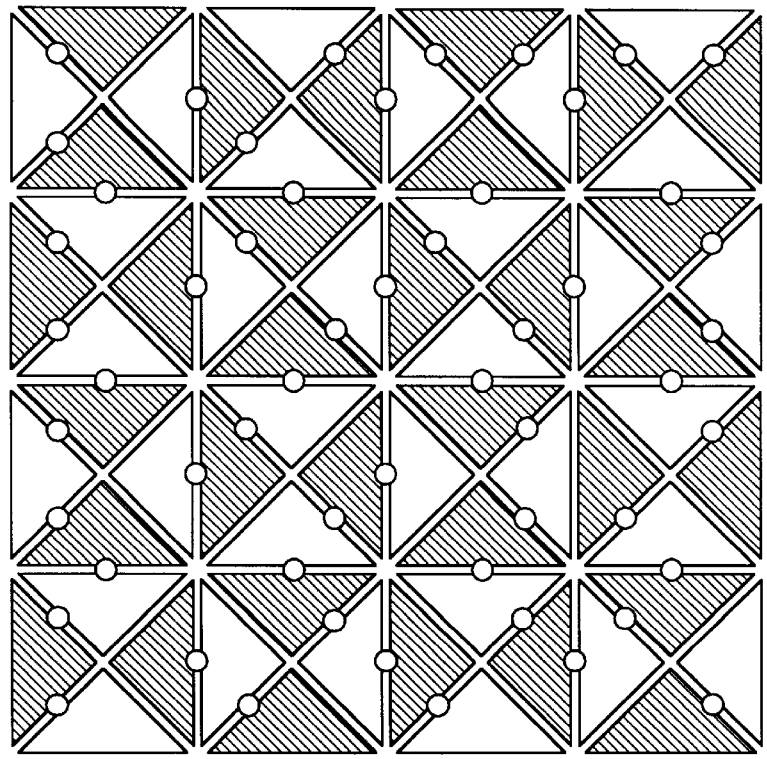
FIG. 8a is a schematic diagram of a second embodiment of a data card illustrating the use of triangular electrodes including a possible scheme for deploying the conductive links between adjacent triangular electrodes.
Figure 8B:
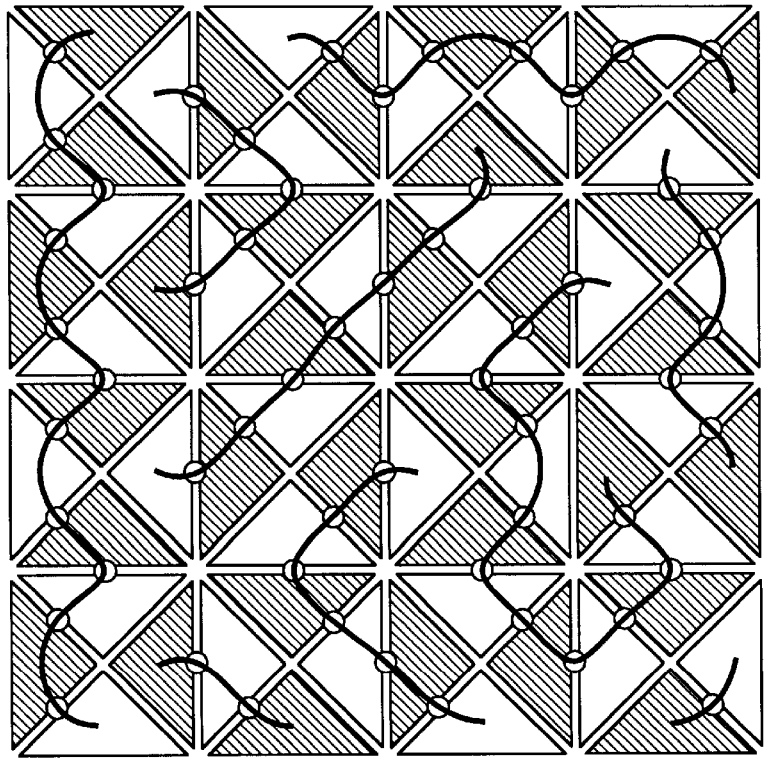
FIG. 8b is a schematic illustration of a data card shown in FIG. 8a with the links connected by an imaginary lines to better illustrate the link pattern.
Figure 9A:
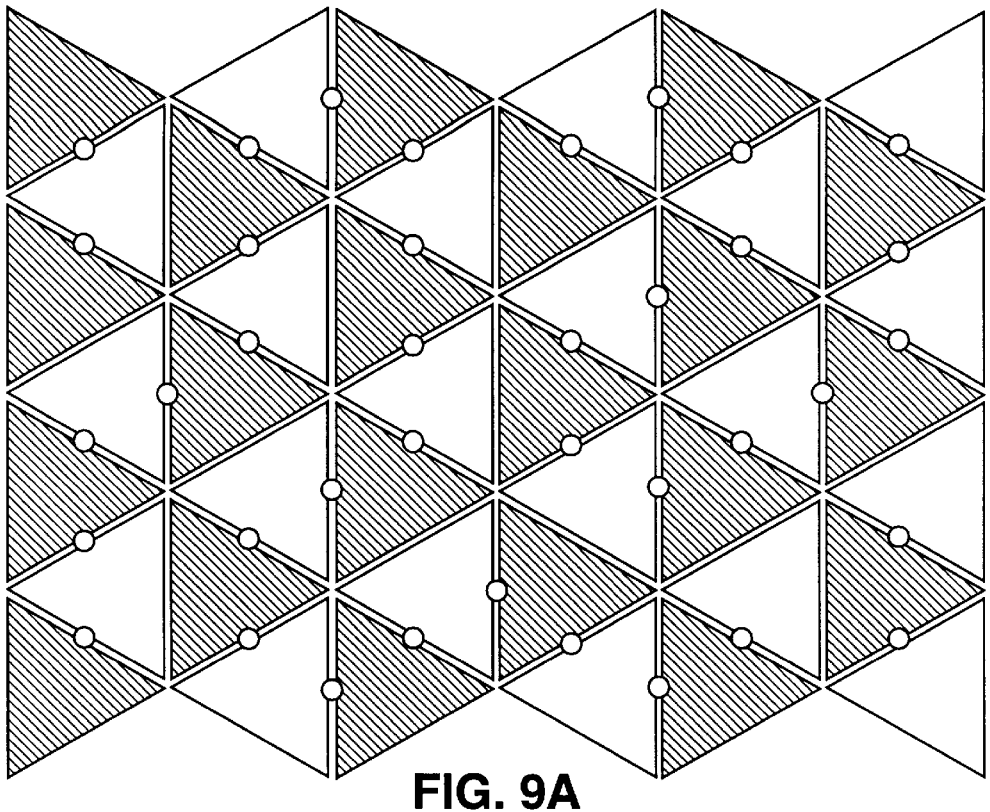
FIG. 9a is a schematic diagram of the third embodiment of a data card illustrating the use of triangular electrodes in an alternate arrangement including a possible scheme for deploying the conductive links between adjacent triangular electrodes.
Figure 9B:
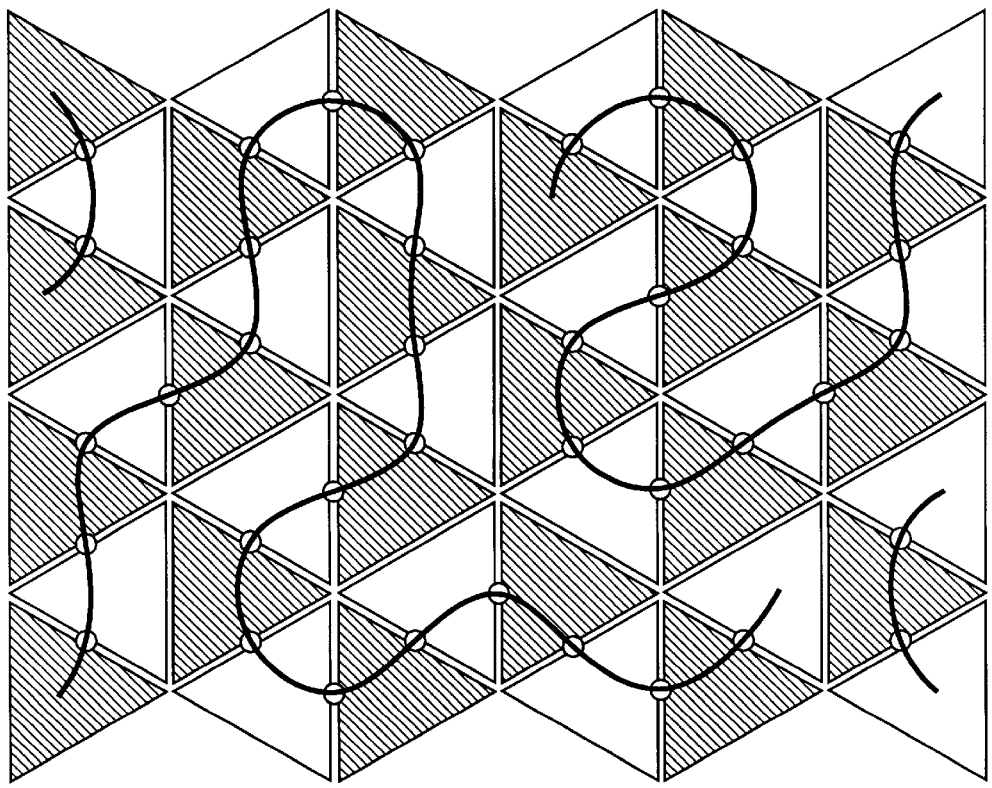
FIG. 9b is a schematic illustration of the data card shown in FIG. 9a with the links connected by an imaginary lines to better illustrate the link pattern.

While one preferred embodiment of the subject invention utilizes rectangular electrodes in an orthogonal rectangular array, there are many additional ways of implementing the same concepts using alternate geometries. For example, FIGS. 8 and 9 show two ways in which triangular electrodes can be arranged on a planar surface. It is clear that the detailed description of the subject invention as given previously would be equally applicable to a system employing triangular electrodes. As noted above, the term "checkerboard" would have to be used in a general sense of a pattern that is alternating and repeating in both the horizontal and vertical directions. Also, a PLL would be more generally defined as the area at which place a side of a first electrode butts up against a side of an adjacent second electrode.

Figure 10A:
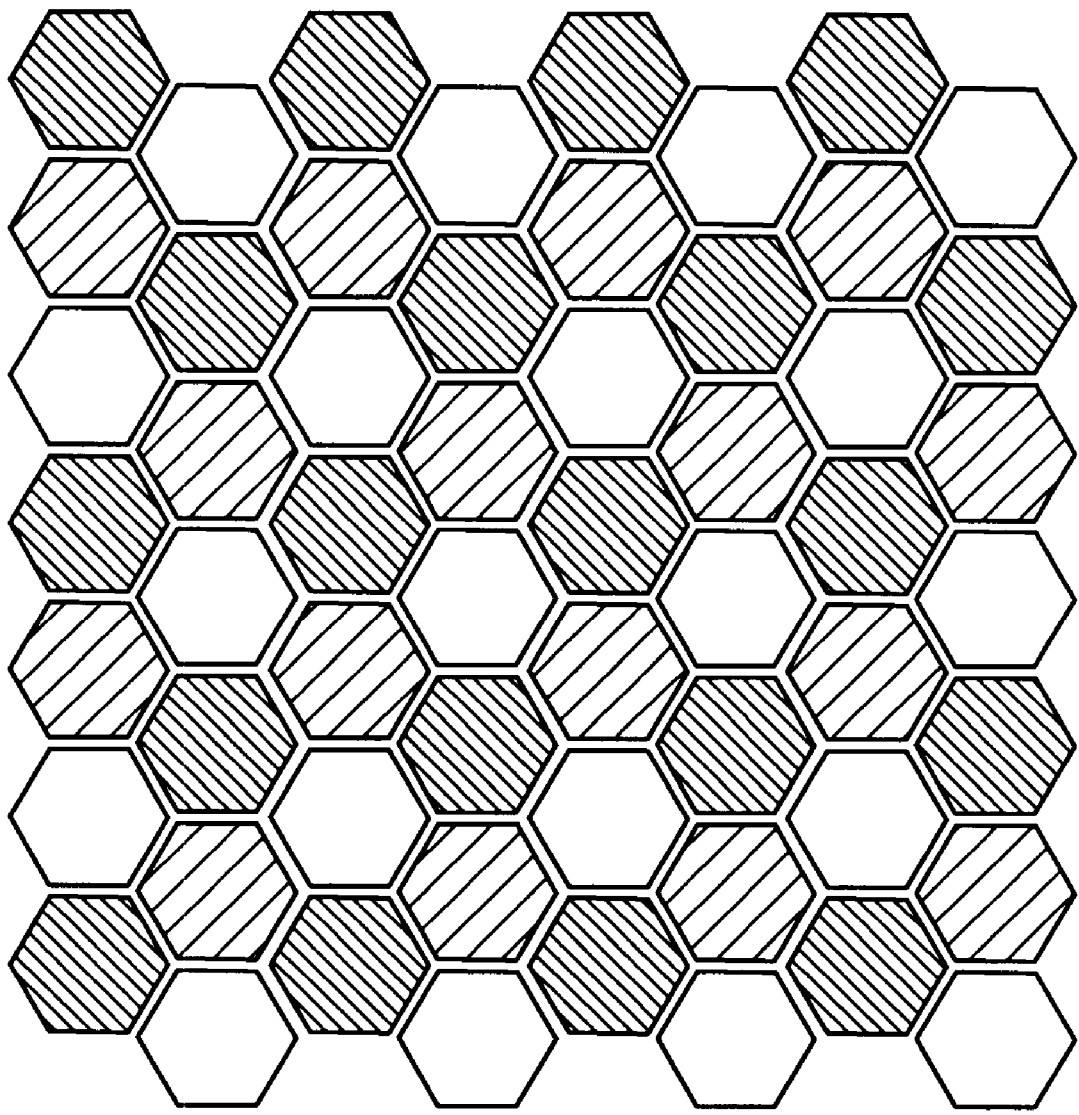
FIG. 10a is a schematic diagram of a fourth embodiment of a data card illustrating the use of hexagonal electrodes.
Figure 10B:
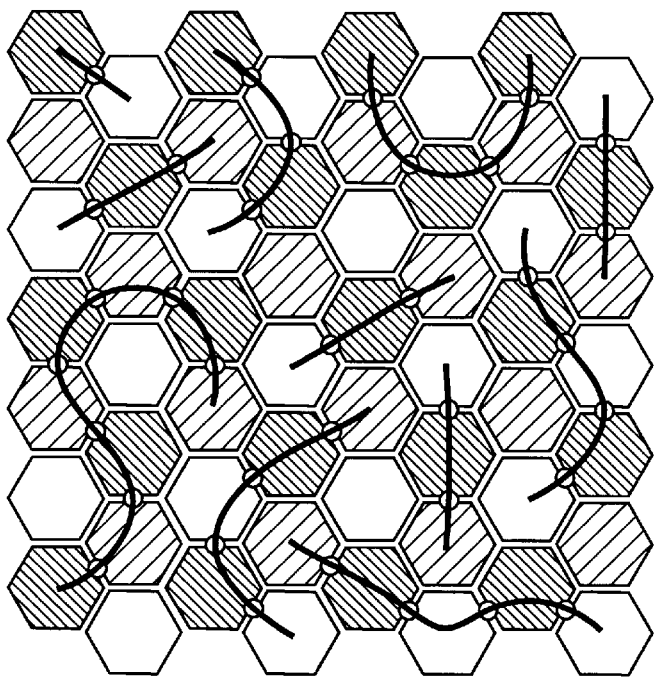
FIG. 10b is a schematic diagram of the data card of FIG. 10a showing one scheme for deploying the conductive links.
Figure 10C:
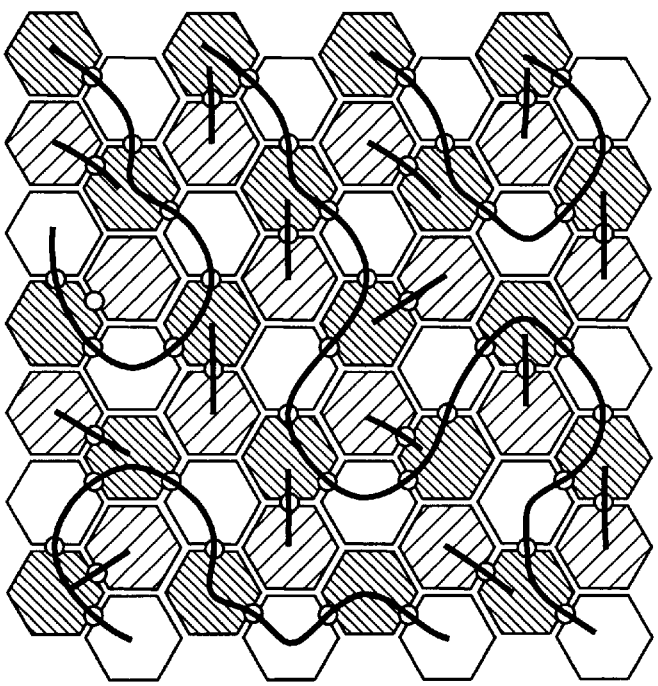
FIG. 10c is a schematic diagram of the data card of FIG. 10a showing an alternative scheme for deploying the conductive links.

FIG. 10a shows a card having hexagonal electrodes. Note that in this embodiment there are three sets of alternating electrodes. In implementing the concepts of the subject invention, the third set of electrodes could be usefully employed in various ways. For example, and as shown in FIG. 10b, the third set could be designed to operate identically to the second set, thereby doubling it's number of members. Alternately, and as shown in FIG. 10c, one can use the extra electrodes as "dead ends."

Figure 11A:
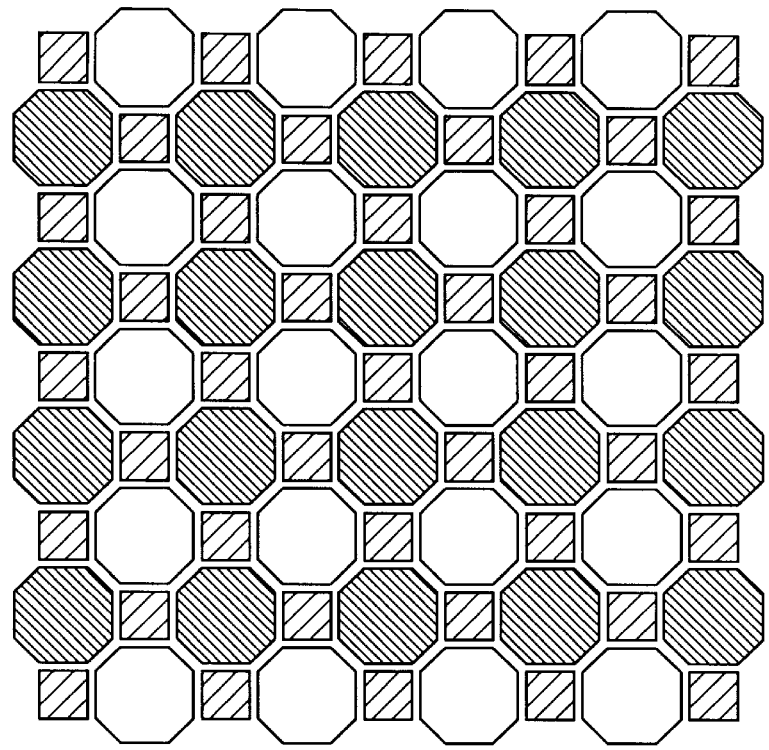
FIG. 11a is a schematic diagram of a fifth embodiment of a data card illustrating the use of a combination of octagonal and square electrodes.
Figure 11B:
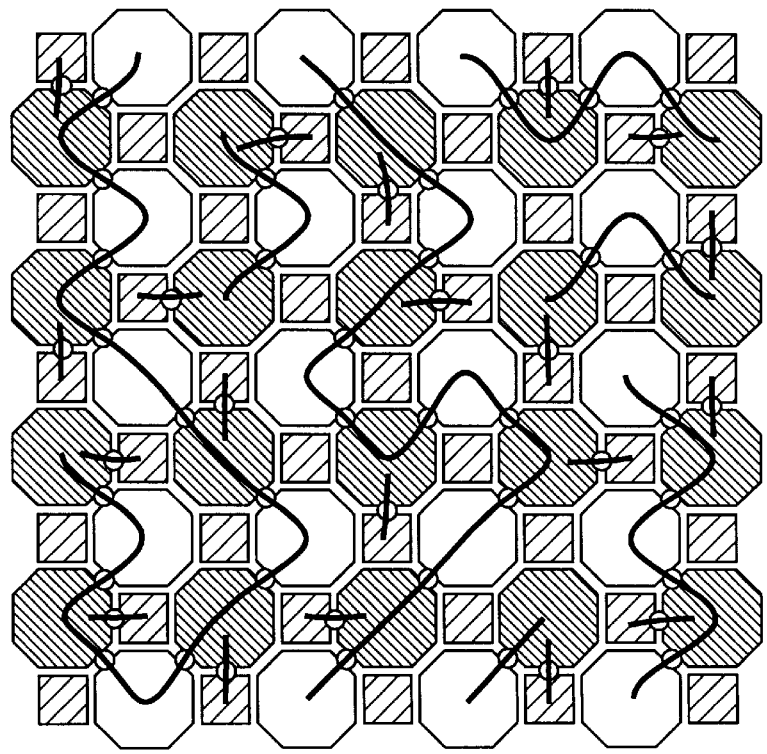
FIG. 11b is a schematic diagram of the data card of FIG. 11a showing one scheme for deploying the conductive links.

FIG. 11a shows an implementation using octagonal and square electrodes. As shown in FIG. 11b, the alternating octagonal electrodes could be used normally and the squares could be used to connect additional dead-end links to the set of first electrodes.

Figure 12A:
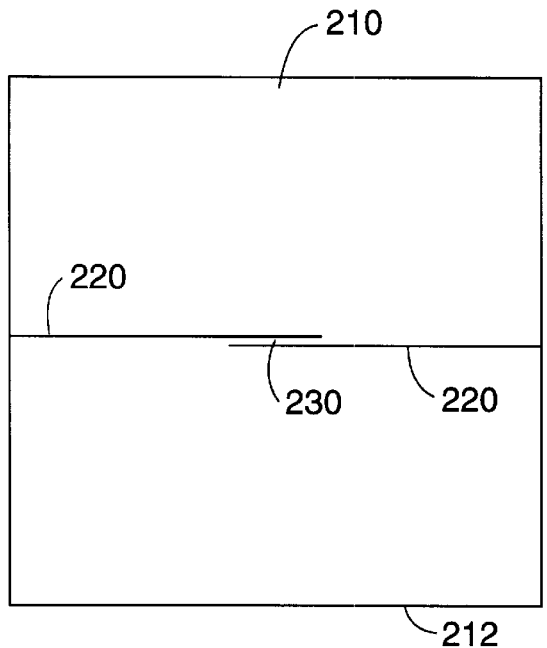
FIG. 12a is a schematic diagram of one way of implementing a fusible link on a card.
Figure 12B:
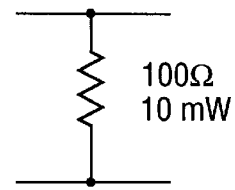

The subject invention also includes the option to employ two or more different styles of links. FIG. 12 shows a schematic diagram of an example of a single link as well as one way of implementing it. More specifically, FIG. 12a shows two electrodes 210 and 212. The division between the two electrodes has been defined by two etched lines 220 and 222 starting from opposite sides of the electrodes and terminating near the center. The two lines are slightly offset and partially overlapping to define a narrow link 230 therebetween. FIG. 12b illustrates the equivalent electrical circuit defined between the electrodes.

Figure 13A:
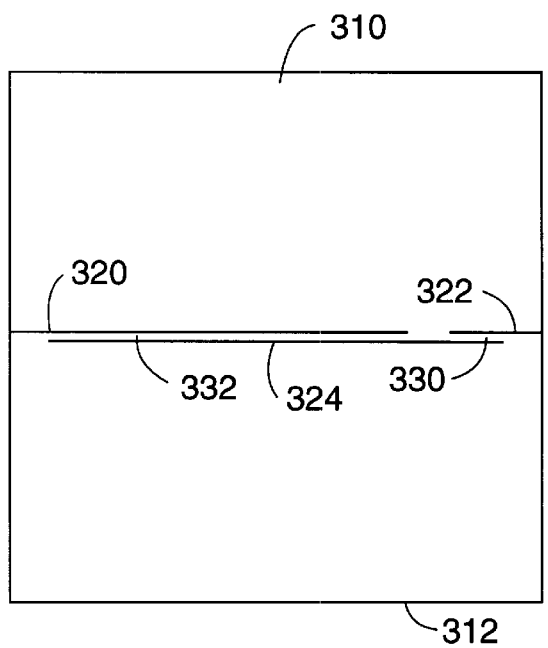
FIG. 13a is a schematic diagram of one way of implementing a fusible link that is electrically in parallel with a high-resistance non-fusible link.
Figure 13B:
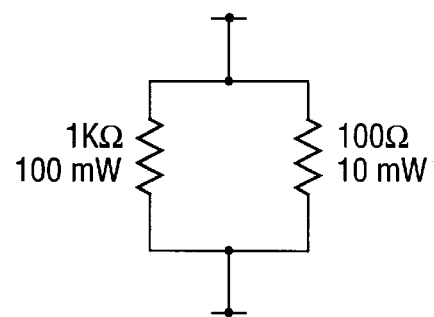

For enhanced encryption capability, two types of links are used—a fusible link and an auxiliary link. FIG. 13 shows an example of a schematic diagram of a dual-link arrangement as well as one way of implementing it. More specifically, FIG. 13a shows two electrodes 310 and 312. The division between the electrodes has been defined by three etched lines 320, 322 and 324. The lines are arranged to define a first link 330 which is fusible and has a low resistance and a low power capacity. The fusible link 330 can be destroyed ("written") by the write signal of the interface module but not by the read signal.

The lines are also configured to define a longer auxiliary link 332 which has a high resistance and a high power capacity. It cannot be destroyed ("written") by the write signal but can be read and accurately classified by the interface module after its' fusible partner is blown.

In the preferred embodiment, an auxiliary link may be placed in parallel with any or all fusible links. Then, even after the basic link at a specific PLL has been destroyed, it is still possible to identify that location as having originally contained a fusible link. The ability to retroactively determine the original locations of destroyed fusible links, combined with the multitude of unique possible card layouts, permits each card to be unique, differentiable, and traceable.

If some or all of the card is designated as "read only" (not to be written to), a further advantage is realized by having more than one style of link. The existence or non-existence of a single link at a PLL creates a single binary bit location. If an arbitrary number (n) of locations are considered, an "n" bit binary word is defined. The total number of unique words from an n bit binary word is 2 to the nth power. However if two styles of links are used, a ternary word is created and the number of unique words rises to 3 to the nth power. If more than two styles of links are used the number of unique words (and therefore cards) available from the fixed and limited of bits or PLLs grows exponentially.

In the preferred embodiment, if a low level of security is sufficient, a group of electrodes and their corresponding links can be logically separated from the read-write (RW) section of the card and reserved as a read-only (RO) section. The RO section will contain a unique card identification (ID) number. If, for example, the RO section reserves sixteen electrodes and their corresponding PLLs and encodes them with a combination of basic and auxiliary links, up to $3^{16}$ or 43 million uniquely ID'd cards could be created for each of the multitude of differently laid out RW link structures.

If enhanced security is desired, the unique flexibility of the hardware permits the implementation of any number of high-security encryption systems. In the preferred embodiment, which employs only one of many possible encryption approaches, the card's ID number will be processed by a proprietary algorithm just prior to the etching of the card. Then, utilizing a private key and a unique identity number for each card, a proprietary encryption algorithm will be used to direct the laser etching of the card. The output of the algorithm will be a code which will select and encode an arbitrarily large number of PLLs on the RW section of the card. The remaining links in the RW section of the card will then be arranged around the predefined link locations.

Subsequently, when the card is inserted into a reader, the reader will first use a stored private key to read a group of selected locations for the card's ID number. The reader will process the retrieved ID number using the de-encryption or inverse algorithm employed during card manufacture to check identified locations in the RW section for the appropriate existence or non-existence of links. If the ID number and the encoded RW section do not agree, the card will be identified as a counterfeit and rejected.

If a fusible link at one of the check locations has already been destroyed, the auxiliary link will still identify that PLL as having had originally contained a fusible link. The auxiliary links at all of the other PLLs are not required for operational reasons, but must be incorporated into the card layout to prevent someone from easily determining the locations of the card's check PLLs.

Figure 14:
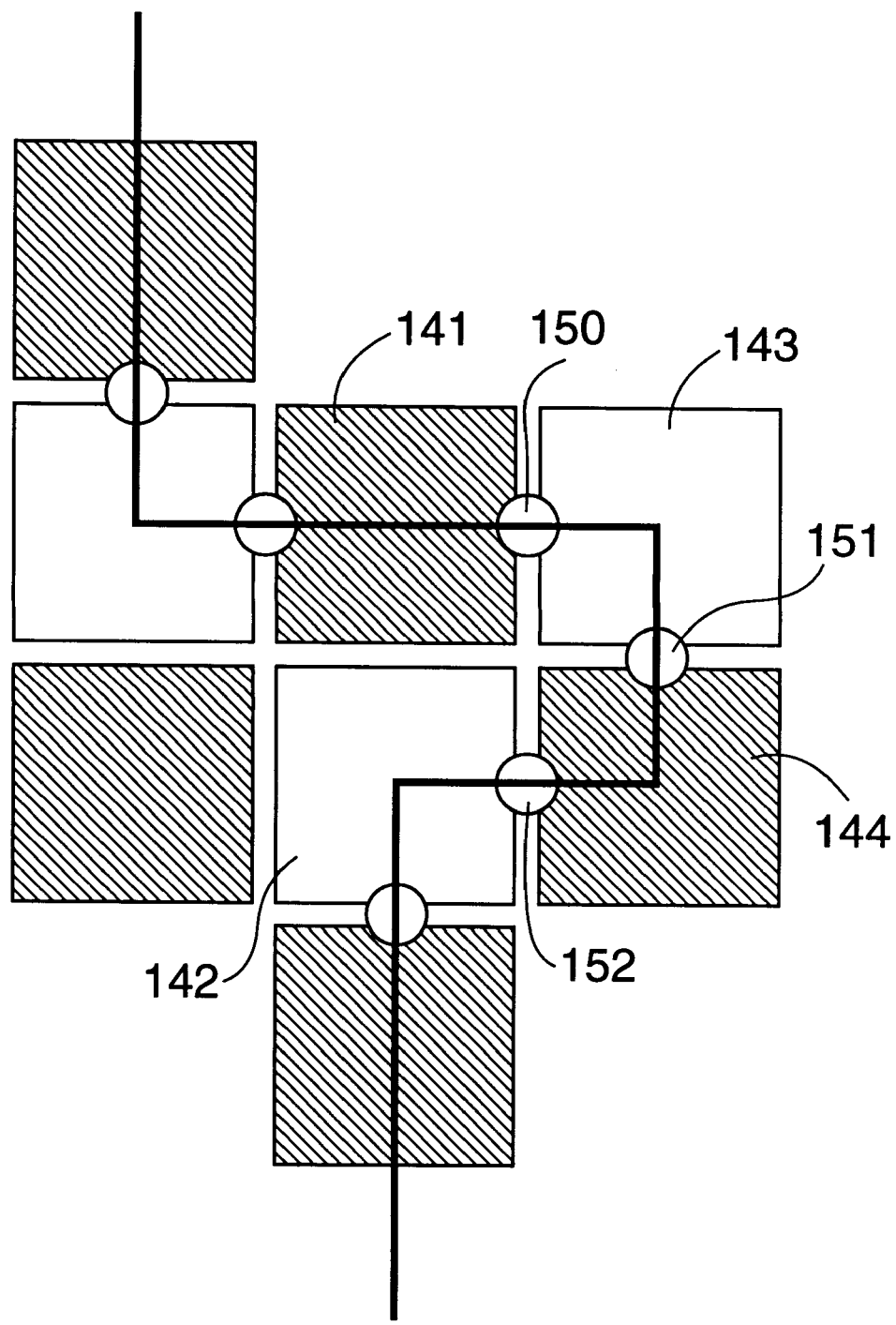
FIG. 14 is a schematic diagram showing an example of a short alternate path.

In practice, it has been found that certain patterns of links cannot be used if reliable performance is to be ensured. In particular, a pattern which wraps back around an electrode pair can provide an alternative current path that would tend to mimic the presence of a link. Such a short alterative path or switchback is shown in FIG. 14. As seen therein, there is no direct connection between electrodes 141 and 142. However, links 150, 151 and 152 are present between adjacent electrodes 141 and 143, electrodes 143 and 144 and electrode 144 and 142, respectively.

In operation, the interface module will attempt to determine if a link is present between electrodes 141 and 142 by applying a signal to electrodes 141 and 142 in an effort to determine the level of impedance therebetween. Since there is no link, the reader should be presented with a high impedance. However, due to the three links 150 to 152 indirectly connecting electrodes 141 and 142 via electrodes 143 and 144, some current flow will be detected.

If an unblown link has a an impedance of "z" ohms, the impedance between electrodes 141 and 142 in FIG. 14 will appear to be 3 z ohms due to links 150 to 152. If the precision of the system is insufficient, it might be difficult to consistently and accurately distinguish the short alternate path impedances from the impedance of an intact link, a blown link, and, when used, an auxiliary link. Short alternate paths can be dealt with by either ensuring that they are not produced in the first place or by judiciously removing one of the links in the path.

In view of the above, most card electrodes will share link connections with only two of their four orthogonally adjacent neighbors. The remaining card electrodes will share a link with only one of their four orthogonally adjacent neighbors. Imaginary lines connecting the links would appear as a number of separate but intertwined "snakes".

While the subject invention has been described with reference to the preferred embodiments, various changes and modifications could be made therein, by one skilled in the art, without varying from the scope and spirit of the subject invention as defined by the appended claims.

We claim:

1. A data card for use with a capacitive reader comprising:

a non-conductive substrate;

a matrix consisting of a plurality of first and second conductive electrodes formed on the substrate, said electrodes having a planar surface configured to function as a capacitive plate, said electrodes being arranged in a checkerboard pattern such that, for all conductive electrodes within the periphery of the pattern, there are at least three of said second conductive electrodes adjacent each of said first conductive electrodes and at least three of said first conductive electrodes adjacent each of said second conductive electrodes; and a plurality of conductive links electrically connecting some of said first conductive electrodes to adjacent ones of said second conductive electrodes and wherein the arrangement of the conductive electrodes permits at least three possible choices to be made to define the connection between any one of said first conductive electrodes within the periphery of the pattern and an adjacent second conductive electrode.

2. A data card as recited in claim 1 wherein a plurality of said first electrodes are connected to at least two adjacent second electrodes.

3. A data card as recited in claim 1 wherein at least some of the links on the data card are configured to represent monetary information.

4. A data card as recited in claim 3 wherein at least some of the links on the data card are configured to reflect a code representing the authenticity of the card.

5. A data card as recited in claim 1 wherein said electrodes on the card are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

6. A data card as recited in claim 1 further including a plurality of third electrodes arranged in an alternating checkerboard pattern with said first and second electrodes, with each said electrode having at least six sides and wherein at least six possible choices can be made to define the link connection to the electrodes located within the periphery of the pattern.

7. A data card as recited in claim 1 wherein all of the electrodes are the same shape on the card.

8. A data card as recited in claim 1 wherein the electrodes have a triangular configuration.

9. A data card as recited in claim 1 wherein the first and second electrodes have eight sides and further including a plurality of third electrodes arranged in an alternating pattern between said first and second electrodes, said third electrodes having four sides.

10. A data card for use with a capacitive reader comprising:

a non-conductive substrate;

a plurality of first conductive electrodes formed on the substrate;

a plurality of second conductive electrodes formed on the substrate, each of said electrodes having a planar surface configured to function as a capacitive plate, said first and second conductive electrodes being arranged in a checkerboard pattern; and a plurality of conductive links electrically connecting selective ones of said first electrodes to said second electrodes and with the arrangement of electrodes permitting at least three possible choices to be made to define the connection between the electrodes within the perimeter of the pattern.

11. A data card as recited in claim 10 wherein a plurality of said first electrodes are connected to at least two adjacent second electrodes.

12. A data card as recited in claim 10 wherein at least some of the links on the data card are configured to represent monetary information.

13. A data card as recited in claim 12 wherein at least some of the links on the data card are configured to reflect a code representing the authenticity of the card.

14. A data card as recited in claim 10 wherein said electrodes on the card are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

15. A data card as recited in claim 10 further including a plurality of third electrodes arranged in an alternating checkerboard pattern with said first and second electrodes, with each said electrode having at least six sides and wherein at least six possible choices can be made to define the link connection to the electrodes located within the periphery of the pattern.

16. A data card as recited in claim 10 wherein all of the electrodes are the same shape on the card.

17. A data card as recited in claim 10 wherein the electrodes have a triangular configuration.

18. A data card as recited in claim 10 wherein the first and second electrodes have eight sides and further including a plurality of third electrodes arranged in an alternating pattern between said first and second electrodes, said third electrodes having four sides.

19. A method of fabricating a data card comprising the steps of:

providing a non-conductive substrate;

forming a plurality of first and second conductive electrodes on the substrate, each of said electrodes having a planar surface configured to function as a capacitive plate, said first and second conductive electrodes being arranged in a checkerboard pattern; and selectively forming a plurality of electrically conductive links between said first and second electrodes in accordance with a predetermined algorithm and with the arrangement of electrodes permitting at least three possible choices to be made to define the connection between the electrodes within the periphery of the pattern.

20. A method as recited in claim 19 wherein the step of forming the electrodes includes providing a conductive layer on the substrate and etching the electrode pattern out of the conductive layer.

21. A method as recited in claim 20 wherein the step of etching the electrode pattern is performed by a processor controlled laser etching device.

22. A method as recited in claim 19 wherein the electrodes created during said forming step are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

23. A method of fabricating data cards comprising the steps of:
   providing a non-conductive substrate for each card;
   forming a plurality of first and second conductive electrodes on each substrate, each of said electrodes having a planar surface configured to function as a capacitive plate, said first and second conductive electrodes being arranged in a checkerboard array; and
   selectively forming a plurality of electrically conductive links between said first and second electrodes on each card according to a unique, predetermined algorithm and wherein the pattern of connections between the first and second electrodes of each card can be varied so that selected first electrodes can be connected to different second electrodes.

24. A method as recited in claim 23 wherein the step of forming the electrodes includes providing a conductive layer on the substrate and etching the electrode pattern out of the conductive layer.

25. A method as recited in claim 24 wherein the step of etching the electrode pattern is performed by a processor controlled laser etching device.

26. A method as recited in claim 23 wherein the electrodes created during said forming step are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

27. A data storage and retrieval system comprising:
   an interface module having a contact face including a plurality of first and second planar electrodes arranged in a checkerboard pattern;
   a data card having a plurality of first and second planar electrodes arranged in a checkerboard pattern and in a manner to be in register with the electrodes of the interface module when the card is aligned with the contact face to permit capacitive coupling therebetween, said data card further including a plurality of conductive links electrically connecting some of said first conductive electrodes to adjacent ones of said second conductive electrodes;
   a signal generator and sensing circuit connectable to the electrodes on said contact face for determining whether a link is present between electrodes on said card; and
   a switch network for connecting said circuit to pairs of said first and second electrodes on said contact face, said switch network being capable of selectively addressing each of the second electrodes adjacent to any of the first electrodes.

28. A system as recited in claim 27 wherein the arrangement of the conductive electrodes permits at least three possible choices to be made to define the connection between any one of said first conductive electrodes within the periphery of the pattern and an adjacent second conductive electrode.

29. A system as recited in claim 27 wherein the arrangement of the conductive electrodes permits at least two possible choices to be made to define the connection between any one of said first conductive electrodes and an adjacent second conductive electrode.

30. A system as recited in claim 27 wherein at least some of the links on the data card are configured to represent monetary information.

31. A system as recited in claim 30 wherein at least some of the links on the data card are configured to reflect a code representing the authenticity of the card.

32. A system as recited in claim 31 wherein the code on the data card is encrypted and wherein said interface module further includes a processor for decrypting the data stored on the card.

33. A system as recited in claim 32 wherein the encrypted data on the card includes a card identification and wherein said processor further functions to decrypt the card identification and uses that information to verify the placement of the links.

34. A system as recited in claim 27 wherein at least some of the links on the card represent data and wherein said circuit is further capable of changing the resistance of a link to alter the data stored on the card.

35. A system as recited in claim 27 wherein said electrodes on the card are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

36. A system as recited in claim 27 further including a plurality of third electrodes arranged in an alternating checkerboard pattern with said first and second electrodes, with each said electrode having at least six sides and wherein at least six possible choices can be made to define the link connection to the electrodes located within the periphery of the pattern.

37. A system as recited in claim 27 wherein all of the electrodes are the same shape on the card.

38. A system as recited in claim 27 wherein the electrodes have a triangular configuration.

39. A system as recited in claim 27 wherein the first and second electrodes have eight sides and further including a plurality of third electrodes arranged in an alternating pattern between said first and second electrodes, said third electrodes having four sides.

40. A data storage and retrieval system comprising:
   an interface module having an contact face including a plurality of first and second planar electrodes arranged in a checkerboard pattern;
   a data card having a plurality of first and second planar electrodes arranged in a checkerboard pattern and in a manner to be in register with the electrodes of the interface module when the card is aligned with the contact face to permit capacitive coupling therebetween, said data card further including a plurality of conductive links electrically connecting some of said first conductive electrodes to adjacent ones of said second conductive electrodes;
   a signal generator and sensing circuit connectable to the electrodes on said contact face for determining whether a link is present between electrodes on said card; and
   a switch network for connecting said circuit to the electrodes on the contact face and arranged to selectively connect to any pair of adjacent first and second electrodes.

41. A system as recited in claim 40 wherein the arrangement of the conductive electrodes permits at least three possible choices to be made to define the connection between any one of said first conductive electrodes within the periphery of the pattern and an adjacent second conductive electrode.

42. A system as recited in claim 40 wherein the arrangement of the conductive electrodes permits at least two possible choices to be made to define the connection between any one of said first conductive electrodes and an adjacent second conductive electrode.

43. A system as recited in claim 40 wherein at least some of the links on the data card are configured to represent monetary information.

44. A system as recited in claim 43 wherein at least some of the links on the data card are configured to reflect a code representing the authenticity of the card.

45. A system as recited in claim 44 wherein the code on the data card is encrypted and wherein said interface module further includes a processor for decrypting the data stored on the card.

46. A system as recited in claim 45 wherein the encrypted data on the card includes a card identification and wherein said processor further functions to decrypt the card identification and uses that information to verify the placement of the links.

47. A system as recited in claim 40 wherein at least some of the links on the card represent data and wherein said circuit is further capable of changing the resistance of a link to alter the data stored on the card.

48. A system as recited in claim 40 wherein said electrodes on the card are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

49. A system as recited in claim 40 further including a plurality of third electrodes arranged in an alternating checkerboard pattern with said first and second electrodes, with each said electrode having at least six sides and wherein at least six possible choices can be made to define the link connection to the electrodes located within the periphery of the pattern.

50. A system as recited in claim 40 wherein all of the electrodes are the same shape on the card.

51. A system as recited in claim 40 wherein the electrodes have a triangular configuration.

52. A system as recited in claim 40 wherein the first and second electrodes have eight sides and further including a plurality of third electrodes arranged in an alternating pattern between said first and second electrodes, said third electrodes having four sides.

53. A data card for use with a capacitive reader comprising:
   a non-conductive substrate;
   a plurality of first conductive electrodes formed on the substrate;
   a plurality of second conductive electrodes formed on the substrate, each of said electrodes having a planar surface configured to function as a capacitive plate, with the position of said conductive electrodes being arranged such that there are at least two of said second conductive electrodes adjacent each of said first conductive electrodes and at least two of said first conductive electrodes adjacent each of said second conductive electrodes; and
   a plurality of conductive links electrically connecting some of said first conductive electrodes to adjacent ones of said second conductive electrodes and wherein the arrangement of the conductive electrodes permits at least two possible choices to be made to define the connection between any one of said first conductive electrodes and an adjacent second conductive electrode.

54. A data card as recited in claim 53 wherein a plurality of said first electrodes are connected to at least two adjacent second electrodes.

55. A data card as recited in claim 53 wherein at least some of the links on the data card are configured to represent monetary information.

56. A data card as recited in claim 55 wherein at least some of the links on the data card are configured to reflect a code representing the authenticity of the card.

57. A data card as recited in claim 53 wherein said electrodes on the card are rectangular and are arranged so that two possible choices are available to define the link connection to the electrodes located at each corner of the pattern and wherein three possible choices can be made to define the link connection to the remainder of the electrodes on the periphery of the pattern and wherein four possible choices can be made to define the link connection to the electrodes located inside the periphery of the pattern.

58. A data card as recited in claim 53 further including a plurality of third electrodes arranged in an alternating checkerboard pattern with said first and second electrodes, with each said electrode having at least six sides and wherein at least six possible choices can be made to define the link connection to the electrodes located within the periphery of the pattern.

59. A data card as recited in claim 53 wherein all of the electrodes are the same shape on the card.

60. A data card as recited in claim 53 wherein the electrodes have a triangular configuration.

61. A data card as recited in claim 53 wherein the first and second electrodes have eight sides and further including a plurality of third electrodes arranged in an alternating pattern between said first and second electrodes, said third electrodes having four sides.

* * * * *